Jan. 23, 1962 J. L. NYGAARD 3,018,373

ANTENNA COUPLING CIRCUIT

Filed July 10, 1958

INVENTOR

James L. Nygaard

BY Stevens, Davis, Miller & Mosher

ATTORNEYS 3,018,373

ANTENNA COUPLING CIRCUIT

James L. Nygaard, Dallas, Tex., assignor to Texas Instruments Incorporated, Dallas, Tex., a corporation of Delaware Filed July 10, 1958, Ser. No. 747,705
6 Claims. (Cl. 250—20)

The present invention relates to a novel antenna circuit and more particularly to an improved radio receiver antenna circuit having a substantially linear sensitivity-versus-frequency characteristic across the entire frequency band of operation of the antenna circuit.

Antenna circuits of the type with which the present invention is particularly concerned, constitute a relatively large coil of wire wound about a ferrite rod and a tuning capacitor connected in parallel with the antenna winding. The tuning capacitor is manipulated to tune the parallel resonant circuit, comprising the winding and the capacitor, to the carrier frequency of the station to be received, and the energy developed in the parallel resonant circuit is normally applied, by means of a pick-up coil also wound in the ferrite rod, to the input electrode of an amplifying device. Difficulty is experienced with the circuit described, as a result of nonlinearity of the sensitivity of the circuit with frequency. Specifically, the voltage induced in the aforesaid pick-up coil of the antenna system varies as a function of the frequency to which the antenna circuit is tuned. The amplitude of the signals applied to the amplifying device, when the circuit is tuned to the low frequency end of the band, is less for a given energy constant of the received signal, than when it is tuned to the high frequency end of the band. Attempts have been made to maximize the response of the antenna system at the low frequency end of the response band of the circuit, but in consequence, the impedance of the pick-up coil was found to be quite considerable at the high frequencies involved.

In a specific example of such a circuit employing a transistor as the amplifying element, the local oscillator section of the transistor circuit includes a feed-back circuit from the collector electrode to the emitter electrode of the transistor and the signal developed in the antenna is applied to the base electrode of the transistor. Due to the control effect exerted upon the transistor by the signals applied to the emitter electrode, signals at the local oscillator frequency are developed across the load in the base circuit. Since signals applied to the emitter and base electrodes of a transistor produce signals 180° out of phase across a collector load, if the impedance of the load in the base circuit is too high it becomes difficult to maintain stable operation of the oscillator circuit due to the degenerative effect produced by the local oscillator signals in the base circuit. In consequence, the impedance of the antenna circuit pick-up coil should not be too high. It has been found that when the number of turns of this coil are limited, however, so that the impedance of the pick-up coil does not interfere with the operation of the oscillator circuit, the proper sensitivity of the antenna circuit to low frequencies is not attained.

By means of the present invention the described difficulties of known arrangements are overcome by providing an antenna circuit having a linear sensitivity-versus-frequency characteristic. This is essentially accomplished by the present invention by means of an antenna circuit which utilizes a pick-up coil directly connected to the antenna coil, which circuit has a compensating impedance for linearizing the sensitivity-versus-frequency characteristic thereof.

In accordance with an illustrative embodiment of the present invention a relatively large capacitor is connected in series with the tuning capacitor in the parallel resonant circuit of the antenna system and the junction of the two capacitors is grounded. This large capacitor has a capacity considerably greater than that of the tuning capacitor and, therefore, has little effect upon the tracking or tuning of the antenna circuit since the total impedance of series connected capacitors is governed by a relationship which is identical in form with that for determining the total impedance of parallel connected resistors. Specifically, if a capacitor having a capacity 50 times that of the tuning capacitor is connected in series therewith, the total value of series capacity in the circuit is 98% that of the circuit when the large capacitor is not connected therein. The large capacitor develops a relatively large voltage thereacross at the low frequency end of the response band of the antenna circuit while developing substantially no signals thereacross at the high frequency end of the band. On the other hand, the pick-up coil, which was previously designed to have as linear a frequency response characteristic as possible, is now designed to respond to signals towards the upper end of the response band of the antenna circuit and to have very little response at the low end of the band. The signals developed across the capacitor and pick-up coil are added to one another, and the relative responses of these two elements are adjusted so that in those portions where the response-versus-frequency curves overlap, the slopes of the curves at any frequency are approximately equal but opposite so that a substantially linear sensitivity-versus-frequency characteristic is developed.

In-phase summation of the signals across the capacitor and pick-up coil is easily accomplished since the voltages induced or developed across a capacitor and a coil in series are 180° out of phase. Thus, the voltages across the capacitor and the antenna coil in the main oscillatory circuit are 180° out of phase. The voltage induced in the pick-up coil is 180° out of phase with that developed in the main antenna coil and, therefore, a simple series connection of the pick-up coil and the capacitor in the main oscillatory circuit insures the in-phase summation of the two signals. As indicated above, the pick-up coil is required to respond only to the upper end of the frequency band and, therefore, the number of turns of the coil may be maintained quite small. This is desirable and constitutes an important feature of the present invention since the inductance of such a coil even at the frequency of the local oscillator is quite small and, as a result, there is substantially no local oscillator signal degeneration due to the connection of the pick-up coil in the base circuit of the transistor employed as the non-linear local oscillator and detector element.

It is, therefore, a principal object of the present invention to increase the frequency response of an antenna circuit by connecting a relatively large capacitor in series with the tuning capacitor of the antenna circuit and utilizing the signals developed across the capacitor and the pick-up coil to linearize the sensitivity-versus-frequency characteristic over the response band of the antenna circuit.

The above and still further objects, features and advantages of the present invention will become apparent upon consideration of the following detailed description of one specific embodiment thereof, especially when taken in conjunction with the accompanying drawing, wherein.

Figure 1:
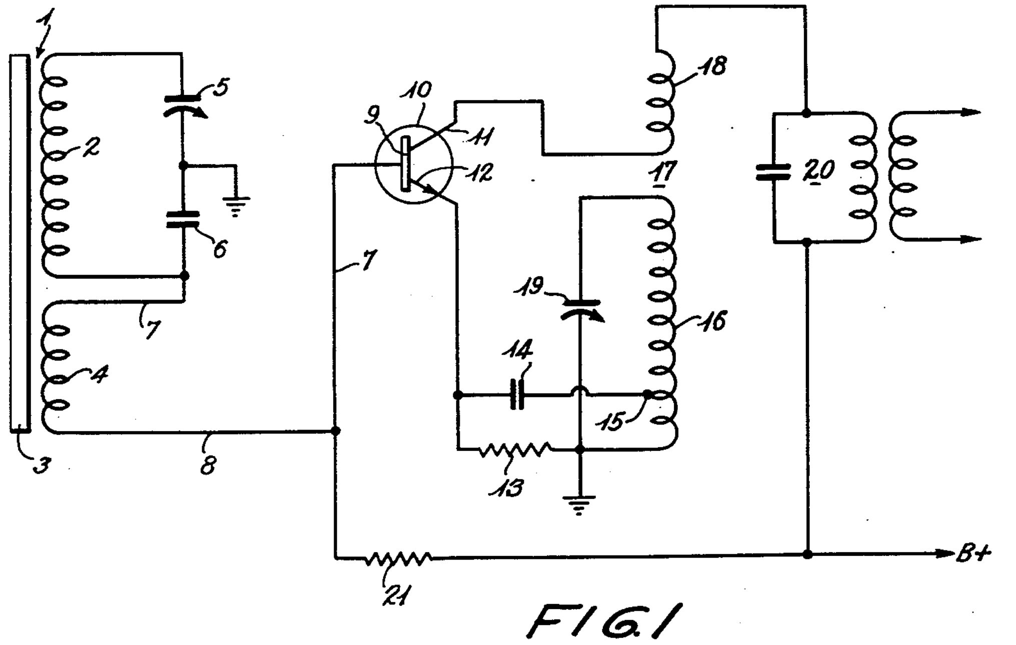
FIGURE 1 is a schematic diagram of the circuit of the present invention.

Referring specifically to FIGURE 1 of the accompanying drawing, there is provided an antenna system generally designated by the reference numeral 1 comprising an antenna coil 2 wound on a ferrite rod 3 and a pick-up coil 4 also wound on the ferrite rod 3. The coil 4 is tightly coupled to the antenna coil 2. The antenna system is tunable and further comprises a variable tuning capacitor 5 and a relatively large capacitor 6 connected in series with one another and across the ends of the antenna coil 2. The junction between the capacitors 5 and 6 is connected to a source of reference potential which for the purposes of explanation is hereinafter designated as ground. The coil 4 has one end connected via a lead 7 to the junction of the capacitor 6 and coil 2 and has its other end connected via a lead 8 to the base electrode 9 of a transistor 10.

The transistor 10 is employed as the amplifying element in a local oscillator circuit and as the non-linear element in the converter or first detector of the receiver. The transistor 10 further comprises a collector electrode 11 and an emitter electrode 12 which is connected through a resistor 13 to ground. The emitter electrode 12 is also connected via a coupling capacitor 14 to a tap 15 on a secondary winding 16 of an oscillator transformer 17 having a primary winding 18. The secondary winding 16 of the oscillator transformer 17 is shunted by a variable local oscillator tuning capacitor 19, the value of which determines the frequency of oscillation of the local oscillator circuit. The primary winding 18 of the local oscillator transformer 17 is connected between the collector electrode 11 of the transistor 10 and a parallel resonant circuit 20 tuned to the intermediate frequency of the receiver. The other end of the tank circuit 20 is connected to the positive terminal of a collector voltage supply which is also connected through a resistor 21 to the base electrode 9 of the transistor 10.

The converter and local oscillator circuits are substantially conventional, the local oscillations being generated by feeding back the collector signals, in the proper phase, through the tuned feed-back transformer 17 to the emitter electrode 12. The frequency of the local oscillator is determined by the value of the variable capacitor 19 which in conjunction with the secondary winding 16 of the local oscillator transformer 17 forms a parallel resonant circuit, a predetermined portion of the energy developed therein being coupled through the capacitor 14 to the emitter electrode 12 of the junction transistor 10.

The transistor 10 is biased to operate upon a non-linear portion of its collector curve, so that signals developed by the antenna circuit on the lead 8 are mixed with the local oscillator signals across the base region of the transistor and in consequence the modulation products of the local oscillator signal and the input signal appear at the collector electrode 11. The desired intermediate frequency signal resulting from the aforesaid modulation is selected by the tuned circuit 20.

In the prior art circuits of interest, the energy developed in the resonant circuit, constituting elements 2 and 5, is coupled via the pick-up coil 4, having one end grounded, to the base electrode 9 of the transistor 10. In such a circuit, the sensitivity of the antenna circuit is greater at higher frequencies than at lower frequencies because the voltage induced in the coil 4 for a given amplitude of signal in the coil 2 is greater at the higher frequencies than at the lower frequencies. If it is attempted to select a number of turns for the coil 4 so that the level of the signal induced in the coil 4 is as near linear as possible across the entire frequency band, it has been found that the impedance of the coil 4 to the local oscillator frequency is so great that it affects the operation of the local oscillator circuit unfavorably. Specifically, if a relatively large local oscillator signal is developed across the coil 4, negative feed-back is introduced into the circuit in a sufficient quantity to render the operation of the local oscillator circuit unstable. Obviously, such a situation cannot be tolerated and, therefore, in the prior art circuits a compromise was reached between sensitivity of the circuit at low frequencies and reasonable stability of the oscillator.

In accordance with the present invention sensitivity of the antenna circuit is maintained linear across the entire operating band of the system by the utilization of the capacitor 6 connected in series with capacitor 5. The capacitor 6 is considerably larger than the capacitor 5 by at least one order of magnitude, and thus has little effect upon the tuning or tracking of the antenna system. For example, if the capacitor 6 is 50 times larger than the capacitor 5, then the total value of capacitive reactance in the tuned circuit is 98% of that present when the capacitor 5 is employed alone. The effect of the capacitor 6 upon the frequency response of the circuit 1, is due to the fact that when the circuit 1 is tuned to the lower end of its frequency band, the impedance of the capacitor 6 is larger relative to its impedance when the circuit is operated at the upper end of its band and, therefore, a relatively large voltage is developed across the capacitor 6 in the former case as compared with the voltage developed thereacross in the latter case. On the other hand, the voltage developed in the coil 4 at the higher frequencies is greater than the voltage developed thereacross at the lower frequencies.

It can be seen that the capacitor 6 improves the low frequency response of the circuit while the coil 4 maintains the high frequency response. By adding the voltages developed across the capacitor 6 and in the coil 4 in a proper sense, the response of the antenna circuit may be maintained linear across its entire frequency band. Specifically, the voltages developed across a capacitor and a coil are approximately 180° out of phase. Also the voltage developed across a secondary winding of the transformer is 180° out of phase with its initiating voltage in the primary winding. In consequence, if the coil 4 and condenser 6 are connected in the circuit as illustrated in FIGURE 1 of the accompanying drawing, their two voltages are in phase; that is, additive, and by properly proportioning the number of turns of the coil 4 with regard to the value of the capacitor 6, the sum of the two voltages may be made linear across the frequency band.

In order to maintain a linear response through the center of the band where both of these voltages are of lesser amplitude than they are at their respective ends, the sum of the characteristic of the two voltages must be made to compensate exactly one another in the region where they overlap. The characteristics of the circuit may be optimized by choosing the number of turns of the coil 4 so that it is essentially out of the circuit as a voltage source at the low end of the frequency band of the antenna, while the capacitor 6 is chosen so as to be essentially out of the circuit at the high end of the band of the system. In the central region of the band, intermediate the ends thereof, the response of both the coil and capacitor is off but by designing the elements so that the slopes of their voltage-versus-frequency characteristics are approximately equal but opposite, a linearized response is obtained even in this region.

The invention has been described as employing an antenna system having a coil wound on a ferrite rod and a variable capacitor for tuning. It is not intended to limit the scope of the invention to the specific details illustrated and as an example of modifications of the circuit which fall within the scope of the invention the circuit may employ coil tuning or may utilize a high permeability, low loss rod other than ferrite.

Figure 2:
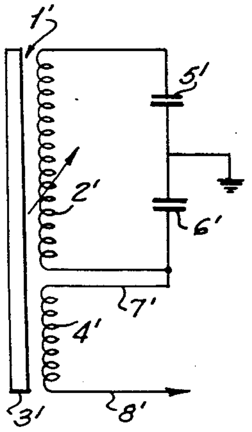
FIGURE 2 is a schematic diagram of another embodiment of the invention.

With reference to FIGURE 2, there is shown an antenna system 1′ comprising an antenna coil 2′ wound on a ferrite rod 3′ and a pick-up coil 4′ also wound on the rod 3′. A pair of capacitors 5′ and 6′ are connected in series across the coil 2′, the coil 4′ being connected at one end to a junction 7′ of the coil 2′ and the capacitor 6′ and at the other end by a lead 8′ to the signal circuit as above. The capacitor 6′ is much larger in magnitude than the capacitor 5′, both capacitors being fixed. It is seen that the circuit of FIGURE 2 is similar in all respects to that of FIGURE 1 except that the former uses a variable inductor for tuning whereas the latter employs capacitor tuning.

Although the invention has been described and illustrated in terms of specific embodiments, it will be clear that variations of the general arrangement and of the details of construction which are specifically illustrated and described may be resorted to without departing from the true spirit and scope of the invention as defined in the appended claims.

What I claim is:

1. An antenna circuit comprising an antenna coil wound on a core of low magnetic loss, high-permeability material, a variable tuning capacitor and a fixed capacitor, said fixed capacitor having a capacity substantially greater than that of said variable capacitor, said capacitors and said antenna coil being connected in a closed series circuit, a pick-up coil wound on said core in close proximity to said antenna coil and receiving energy therefrom, said pick-up coil having one end connected to the junction of said antenna coil and said fixed capacitor such that the voltages developed across said fixed capacitor and said pick-up coil are additive, the voltage-versus-frequency characteristic curves of said pick-up coil and said fixed capacitor being such that the sum of said voltages is generally linear with frequency.

2. The combination according to claim 1 further comprising a transistor including a base electrode connected to the other end of said pick-up coil.

3. The combination according to claim 2 further comprising a local oscillator circuit and a first detector circuit each including said transistor as an amplifying element.

4. The combination according to claim 1 wherein said fixed capacitor has a capacity at least one order of magnitude greater than said variable capacitor.

5. An antenna circuit comprising an antenna coil, a variable tuning capacitor and a fixed capacitor connected in a first closed series circuit with said antenna coil, said fixed capacitor having a large value of capacity relative to the capacity of said variable capacitor, a pick-up coil inductively coupled to said antenna coil to receive energy therefrom, signal utilization means, said pick-up coil and said fixed capacitor being connected in a second closed series circuit with said signal utilization means.

6. An antenna circuit comprising an antenna coil, a first capacitor and a second capacitor connected in a first closed series circuit with said antenna coil, said second capacitor having a large value of capacity relative to the capacity of said first capacitor, the reactance of one of said antenna coil and said first capacitor being variable, a pick-up coil inductively coupled to said antenna coil to receive energy therefrom, signal utilization means, said pick-up coil and said second capacitor being connected in a second closed series circuit with said signal utilization means.

References Cited in the file of this patent

UNITED STATES PATENTS

| | | |
|---|---|---|
| 1,644,906 | Williams | Oct. 11, 1927 |
| 2,152,448 | White | Mar. 28, 1939 |
| 2,262,979 | Vilkomerson | Nov. 18, 1941 |
| 2,641,704 | Stott | June 9, 1953 |
| 2,774,866 | Burger | Dec. 18, 1956 |
| 2,892,931 | Koch | June 30, 1959 |
| 2,897,353 | Schweiss | July 28, 1959 |

FOREIGN PATENTS

| | | |
|---|---|---|
| 271,257 | Great Britain | May 26, 1927 |